United States Patent
Jordil et al.

(10) Patent No.: US 7,213,344 B2
(45) Date of Patent: May 8, 2007

(54) MOTORIZED ORIENTABLE MEASURING HEAD

(75) Inventors: Pascal Jordil, Ecoteaux (CH); Claude Rouge, Baulmes (CH)

(73) Assignee: TESA SA, Renens (CH)

( * ) Notice: Subject to any disclaimer, the term of this patent is extended or adjusted under 35 U.S.C. 154(b) by 0 days.

(21) Appl. No.: 11/291,566

(22) Filed: Nov. 30, 2005

(65) Prior Publication Data

US 2006/0112578 A1 Jun. 1, 2006

(30) Foreign Application Priority Data

| Dec. 1, 2004 | (EP) | ................................. 04106226 |
| Dec. 15, 2004 | (EP) | ................................. 04106607 |
| Dec. 24, 2004 | (EP) | ................................. 04106980 |

(51) Int. Cl.
*G01B 5/00* (2006.01)
*G01B 5/20* (2006.01)

(52) U.S. Cl. .......................................... 33/559; 33/556

(58) Field of Classification Search ................... 33/559
See application file for complete search history.

(56) References Cited

U.S. PATENT DOCUMENTS

| 5,212,646 | A | | 5/1993 | McMurtry ................... 33/504 |
| 5,675,902 | A | * | 10/1997 | Chase ......................... 33/559 |
| 5,979,070 | A | * | 11/1999 | Lau ............................. 33/559 |
| 6,170,358 | B1 | | 1/2001 | Hunter ....................... 33/1 PT |
| 6,546,643 | B2 | * | 4/2003 | Lotze et al. .................. 33/559 |
| 2004/0149057 | A1 | * | 8/2004 | Jordil et al. ............... 73/866.5 |
| 2006/0196066 | A1 | * | 9/2006 | Lloyd et al. ................. 33/559 |

FOREIGN PATENT DOCUMENTS

GB  2 037 436 A  7/1980

* cited by examiner

*Primary Examiner*—Christopher W. Fulton
(74) *Attorney, Agent, or Firm*—Pearne & Gordon LLP

(57) ABSTRACT

Motorized indexed measuring head for a machine for measuring three-dimensional coordinates. The orientable axes are actuated by motors rigidly supported on bearings or ball bearings. The rotation is transmitted to the re-orientable elements by transmission elements having sufficient play so that the indexing accuracy is not impaired.

11 Claims, 6 Drawing Sheets

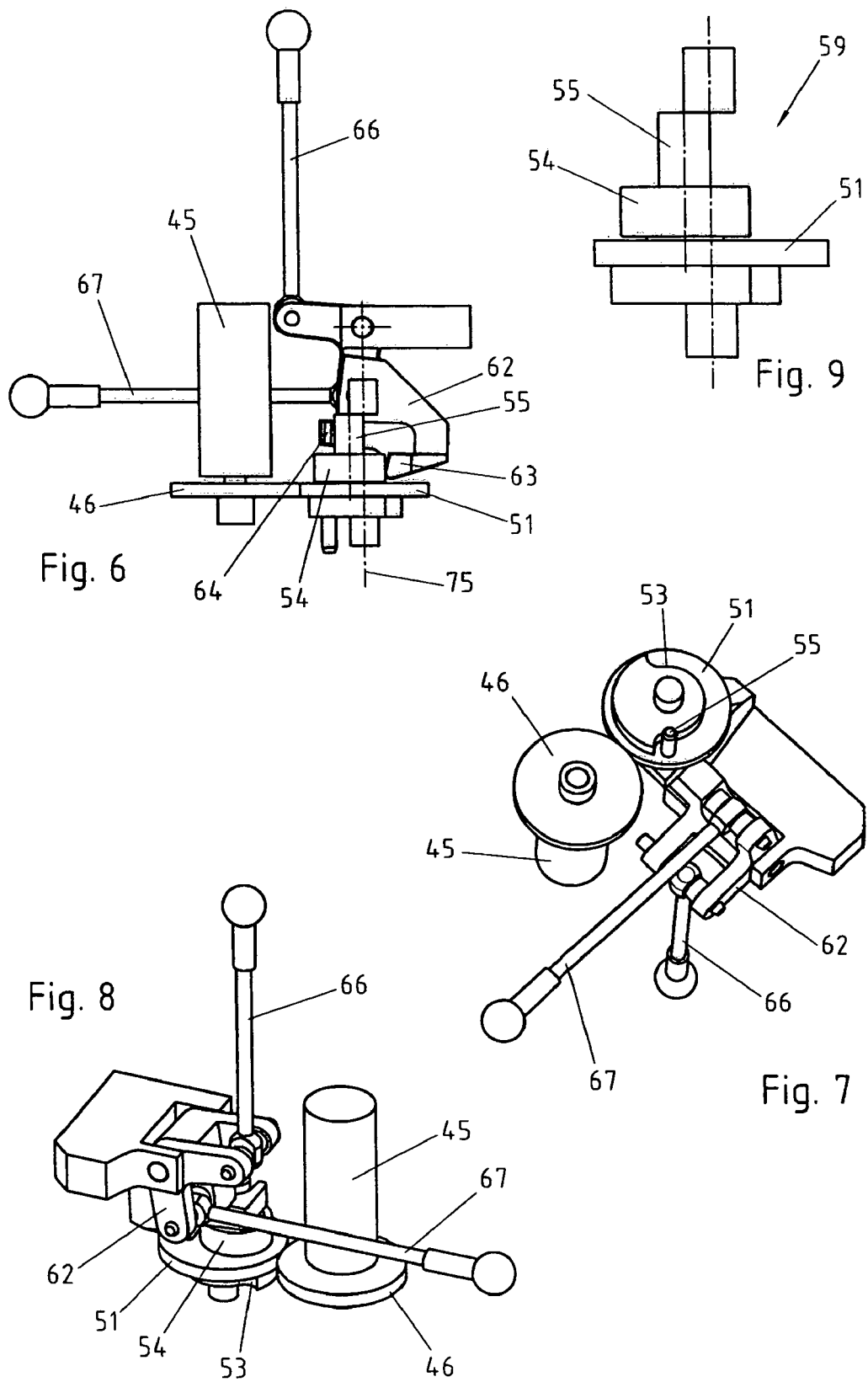

MOTORIZED ORIENTABLE MEASURING HEAD

REFERENCE DATA

This application claims priority from European patent applications N° 2004EP-106226 filed on Dec. 1, 2004, N° 2004EP-106607 of Dec. 15, 2004 and N° 2004EP-106980 of Dec. 24, 2004, the contents whereof are hereby incorporated by reference.

TECHNICAL FIELD

The present invention concerns a re-orientable measuring head for measuring three-dimensional coordinates of a mechanical part and notably, though not exclusively, a re-orientable measuring head designed to be used on a manual or automatic machine for measuring coordinates.

RELATED ART

Touch probes are measuring instruments used for example on production lines of mechanical parts, for checking dimensions or surfaces of machined parts. Touch probes are also used for capturing the three-dimensional shape of complex pieces, in order for example to reproduce or model them.

Probes generally comprise a measuring head, designed to be fastened onto the arm of a measuring machine and a mobile feeler, comprising a sphere at the end of an elongated rod and designed to be brought into contact with the piece to be measured.

In most applications, touch probes are fastened on the mobile arm of a machine whose position in space can be determined accurately by means of a manual or automatic measuring system, such as for example position encoders placed on the axes of the machine. The mobile arm is moved in space to bring the probe's measuring feeler into contact with the piece or surface to be measured. During contact, a deflective force is then applied on the feeler, moving it away from its initial resting position. A sensor reacts to the slightest displacement of the feeler, generating an electric signal that is sent either to the user, in the form of a light signal, or to the machine's control software which thus determines, on the basis of the data of the measuring system, the coordinates of the contact point within a given reference frame. For this purpose, the prior art uses electromechanical or optical sensors or movement sensors based on different principles, for example sensors comprising constraint gauges.

In the case of a three-dimensional touch probe, the connection between the feeler and the fixed part of the measuring head is usually realized according to the principle of the Boys connection, i.e. for example by three cylindrical pins resting on six spheres so as to define six contact points between the fixed organ and the feeler. Two- and one-dimensional probes are however also known.

When the probe is used for measuring pieces of complex shape, having cavities and protuberances, it is difficult or even impossible to bring the feeler into contact with the entire surface of the piece without the fixed part of the measuring head or the feeler's rod interfering with elements of the piece to be measured. To remedy this inconvenience, measuring heads are known that allow the contact feeler to be oriented in a plurality of directions in space. Generally, two independent rotation axes are required to cover all the possible orientations. An instrument of this type is described in European patent application EP0392660.

Use of this type of devices is however not limited to contact feelers and they can also be used with probes without contact, for example video cameras, for inspecting and checking machined parts for example.

The rotation axes are preferably indexed, in the sense that a sufficiently large but finite number of predetermined and accurately reproducible resting positions are provided. This arrangement avoids the measuring machine having to be re-calibrated after each change in orientation of the feeler.

The indexing of the feeler's rotation axes is achieved by indexing surfaces that engage mutually and define the desired resting positions, for example by a crown of spheres in which three pins engage. An example of this type of indexing mechanism is presented in European patent application EP1443299 in the name of the applicant. Optimum accuracy is achieved when the indexing surfaces define an isostatic connection with six independent contact points in each of the indexed positions.

For measuring complex pieces, it is desirable that the measuring head be motorized in order to orient the probe feeler automatically, upon command from the measuring machine's control program. For this purpose, the rotating and the locking of the feeler's axes are performed by electromagnetic actuators, for example engines or servomotors that move the indexing surfaces away and imprint a rotation to the axes.

When the number of indexed positions is high, the axes' driving mechanism must guarantee a high angular accuracy without however introducing additional mechanical constraints on the orientable elements, which could impair the indexing accuracy. It is difficult in known measuring heads to reconcile these two opposite requirements.

DESCRIPTION OF THE INVENTION

One aim of the present invention is to propose a measuring head free of the limitations of the known devices and, notably, a measuring head wherein the rotation around the axes is performed accurately, without introducing mechanical constraints in the indexed position that could affect the indexing accuracy.

These aims are achieved by the device comprising the combination of characteristics that are the object of the main claim, and notably by a re-orientable measuring head for re-orienting a probe feeler relatively to a measuring apparatus comprising: a support element; a first re-orientable element connected to said support element capable of turning around a first axis relatively to said support element; a rotational actuator connected so as to be able to turn around said first axis, a first transmission between said support element and said rotational actuator for driving said actuator around said first axis at a constant distance from said first axis; a second transmission between said rotational actuator and said first orientable element, for driving said first orientable element.

BRIEF DESCRIPTION OF THE DRAWINGS

The present invention will be better understood by reading the description given by way of example and illustrated by the attached figures showing:

FIG. 5 to 8, different views of the actuator responsible for the locking and unlocking according to one aspect of the invention;

FIG. 9, a detailed view of a crankshaft included in the actuator of FIGS. 5–8;

EMBODIMENT(S) OF THE INVENTION

Figure 1:
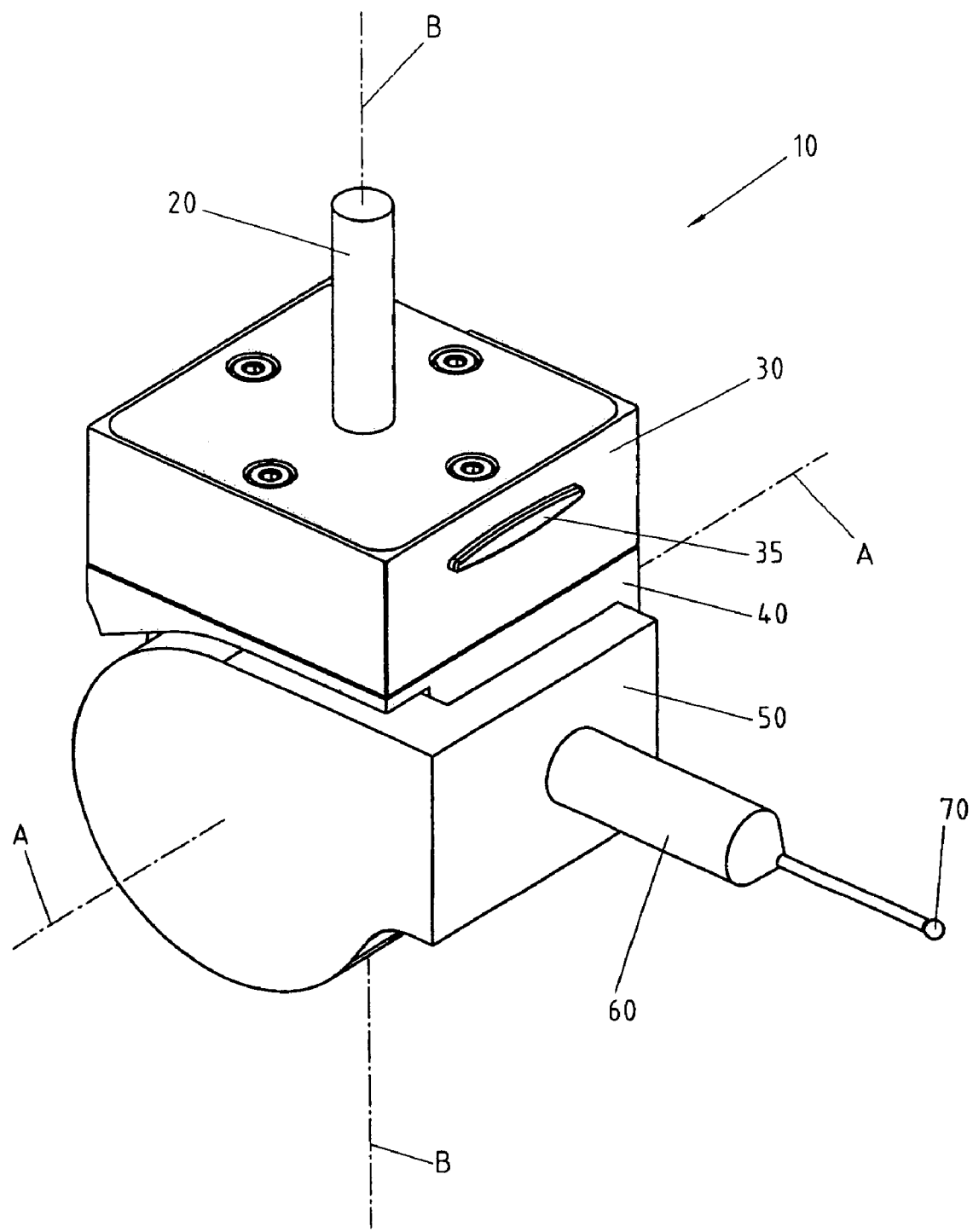
FIG. 1, a view of a motorized measuring head according to the invention.

With reference to FIG. 1, a re-orientable measuring head 10 according to the invention comprises a support 30 designed to be fastened onto the arm of a measuring machine, capable of moving, for example along three axes of coordinates X, Y and Z inside a measuring volume. It can be fastened for example by the rod 20 or by any other fastening means.

Hereinafter, for the sake of simplicity, the designation "vertical" will be used for referring to the orientation of the axis B in FIG. 1. This designation refers to the conventional orientation of the figures and also to the orientation in which the inventive device is normally used and usually coincides with the direction of the vertical axis Z of the measuring machine onto which the probe is mounted. However, the probe can be used with any orientation in space.

A first re-orientable element 40 is fastened to the support 30, so as to be able to turn around the vertical axis B. The first re-orientable element 40 can preferably take up a plurality of indexed positions, corresponding to multiples of a small predetermined angle, for example 10 degrees. In known fashion, these indexed positions are determined for example by an isostatic connection defining six resting points between positioning elements whose position is determined with great accuracy.

The second re-orientable element 50 is free to turn around the horizontal axis A united with the first re-orientable element 40. The rotation of the second re-orientable element 50 around the axis A can be continuous or indexed, motorized or manual, as for the first re-orientable element 40 here above.

A probe feeler 60 is fastened to the second re-orientable element 50 and bears, at its extremity, a sphere 70 designed to come into contact with the piece to be measured. A detection mechanism, not represented, thus responds to the slightest displacement of the sphere 70 relatively to the resting position with an electric signal that is sent either to the light display 35 or to the machine's control software, by a connector (not represented).

The locking and unlocking mechanism of the axes according to one aspect of the invention will now be described with reference to FIGS. 2 and 3.

The support 30 bears a series of balls 31 placed along a circumference with a usually constant angular distance, for example by 10°, so as to define a series of indexed position usually regularly spaced. The first re-orientable element 40 bears, corresponding to the balls 31, three pins 41 at a distance of 120° and capable of engaging with the balls 31. In locked position (FIG. 2), the first re-orientable element 40 is brought, by pulling the rod 66, against the fixed element 30. Each of the pins 41 then touches two adjacent balls 31 so as to have an isostatic connection between the support element 30 and the re-orientable element 40, according to the principle of the Boys connection.

In equivalent manner, in the frame of the present invention, it would be possible to exchange the position of the balls and of the pins, by placing the first on the re-orientable element and the latter on the support element. One could also replace the balls and pins by other positioning elements capable of defining six contact points between the support element 30 and the re-orientable element 40.

One extremity of the vertical rod 66 is fastened in articulated manner to the support element 30 whereas the other extremity of the rod 66 is fastened in articulated manner to one arm of the lever 62, capable of pivoting around the axis 65, fixed relative to the first re-orientable element 40. The rod 66 is preferably aligned with the rotation axis B.

Figure 2:
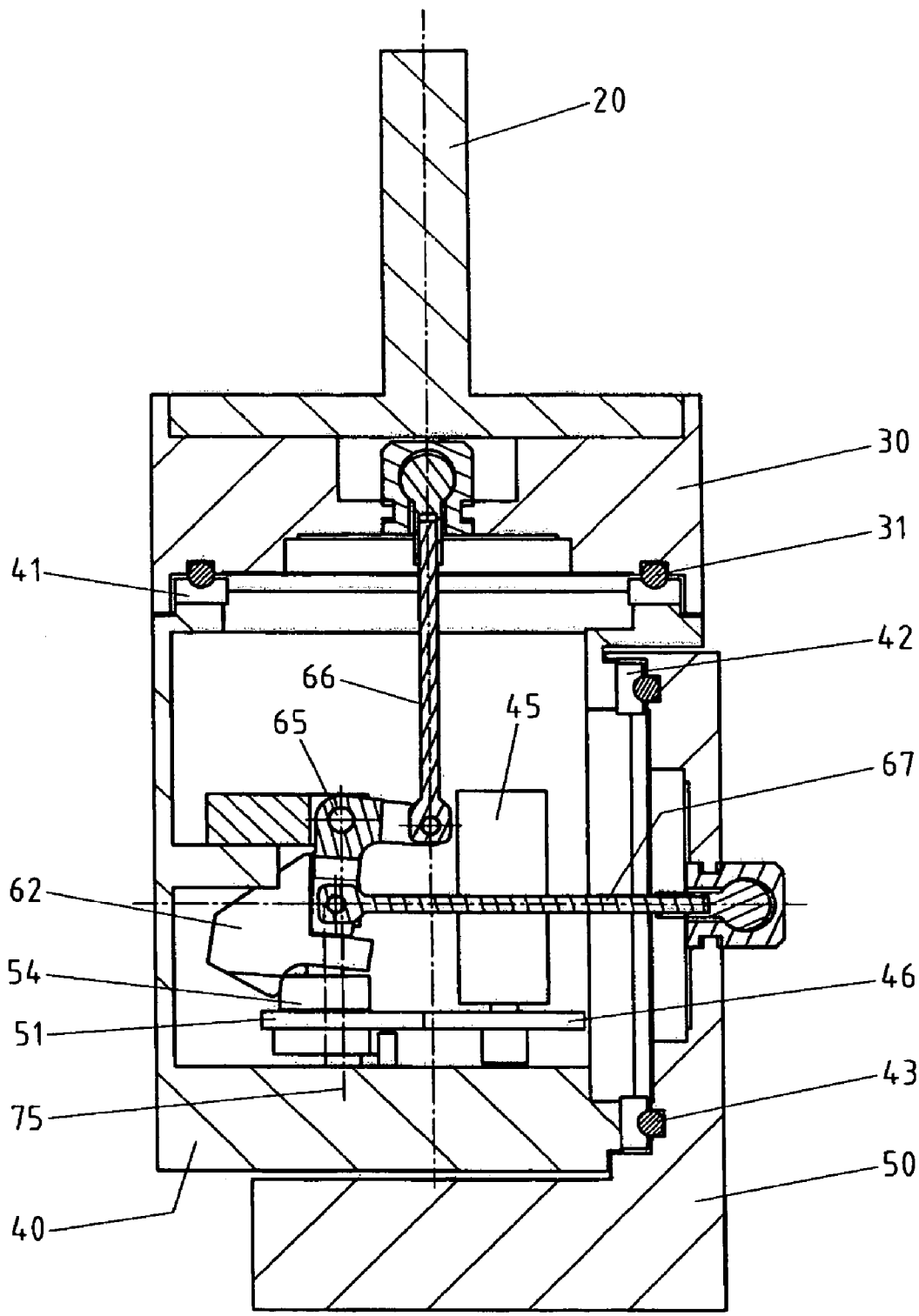
FIG. 2, a cross section of the inventive measuring head in locked position.

In the locked state of FIG. 2, the rod 66 is tensioned and pulls the first re-orientable element 40 upwards so that the indexing pins 41 engage with the balls 31 of the support 30. In this state, any rotation around the axis B is impossible and the re-orientable element 40 is locked in one of the indexed positions.

The force exerted by the rod 66 is applied centrally relatively to the contact points between the balls 31 and the pins 41, and is oriented along the axis B. In this manner, one achieves an equal distribution of the contact forces between the balls 31 and the pins 341 for a maximum indexing accuracy.

The second re-orientable element 50 is also held against the first re-orientable element 40 by the tension of the horizontal rod 67 aligned with the axis A. The rod 67 is articulated on the one hand relatively to the re-orientable element 50 and on the other hand relatively to the lever 62.

A second set of balls 43 and of pins 42, placed between the first and second re-orientable elements, allows the rotation of the second re-orientable element 50 to be locked in an indexed position.

Optionally, the rods 66 and 67 comprise elastic elements (not represented), for example metallic springs, to ensure a constant indexing force between the pins 41, 42 and the balls 31, 43. In equivalent manner, elastic elements could be included in the lever 62 or in the first and second re-orientable elements.

With reference to FIGS. 5–9, the position of the lever 62 is determined by the crankshaft 59, represented in detail in FIG. 9, driven in rotation around the axis 75 by the electric motor 45 and the dented wheels 46, 51. In equivalent manner, the crankshaft 59 could be driven directly by a motor placed on the same axis 75 of the crankshaft 59 or by any mechanical transmission, for example by a system of pulleys.

One arm of the lever 62 comprises a fork whose two branches 63 and 64 contact the two opposite sides of the crank pin 55 of the crankshaft 59, so as to move the lever 62 from the locked position to the unlocked position when the crankshaft 59 turns by 180°. Optionally, a ball bearing is interposed between the crank pin 55 and the fork in order to reduce friction during locking and/or unlocking. In the embodiment illustrated in the figures, a ball bearing 54 is provided only to correspond to the branch 63 that transmits the locking force. To correspond to the other branch 64 of the fork, responsible for unlocking, the efforts required are less and a simple antifriction bearing can be used.

The rotation of the crankshaft 59 around the axis 75 is limited to a rotation angle slightly greater than 180° by the sector 53 and the pin 55 united with the first re-orientable element 40. The stop positions of the pin 55 against the extremities of the sector 53 are disposed so as to overtake the points of equilibrium and thus to define stable resting positions corresponding respectively to the locked state and to the unlocked state.

Figure 3:
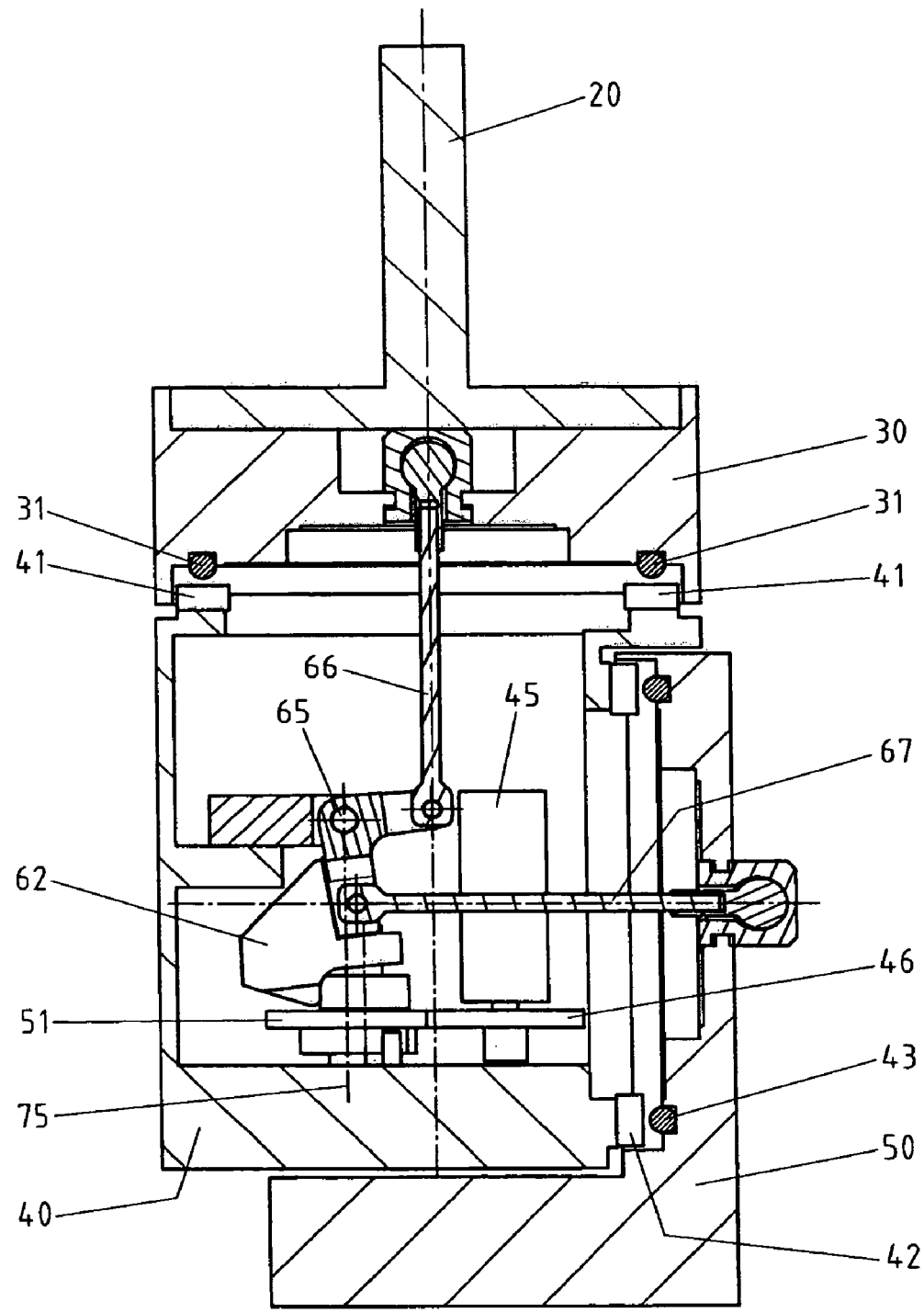
FIG. 3, a cross section of the inventive measuring head in unlocked position.
Figure 4:
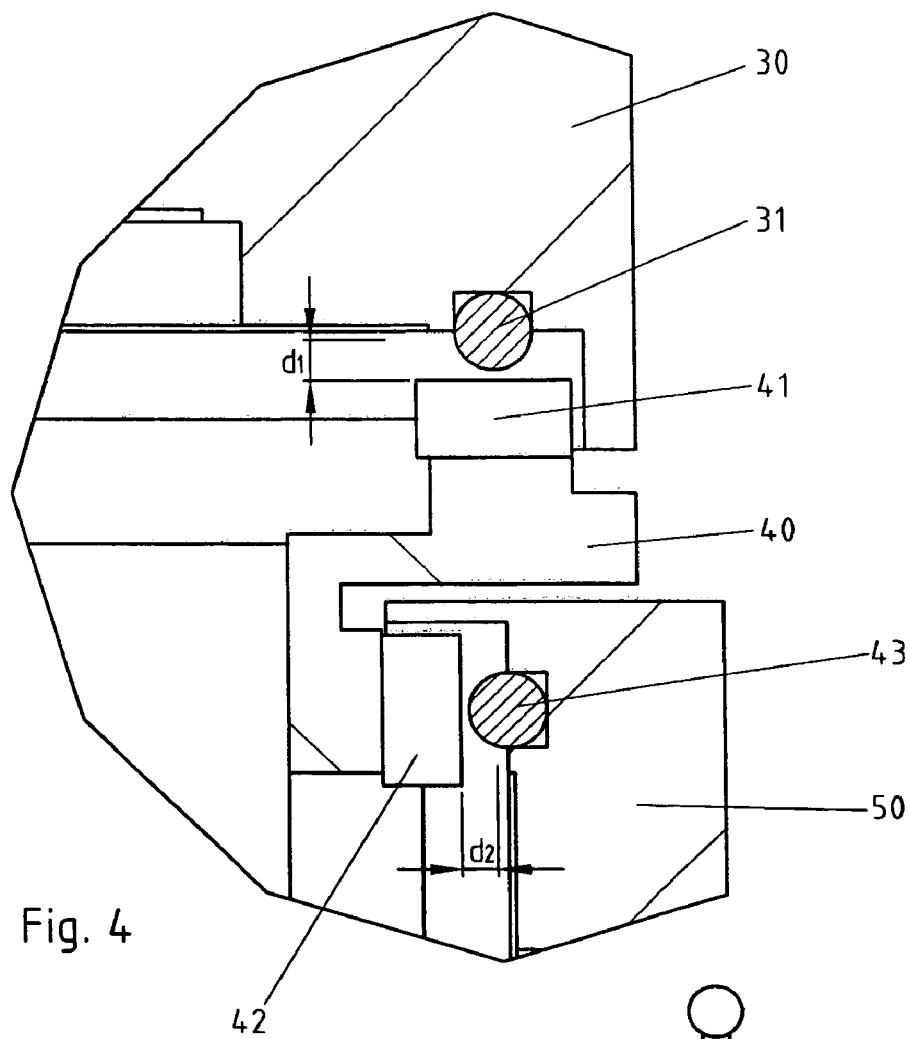
FIG. 4, a detail of the locking/unlocking mechanism of the inventive measuring head.
Figure 5:
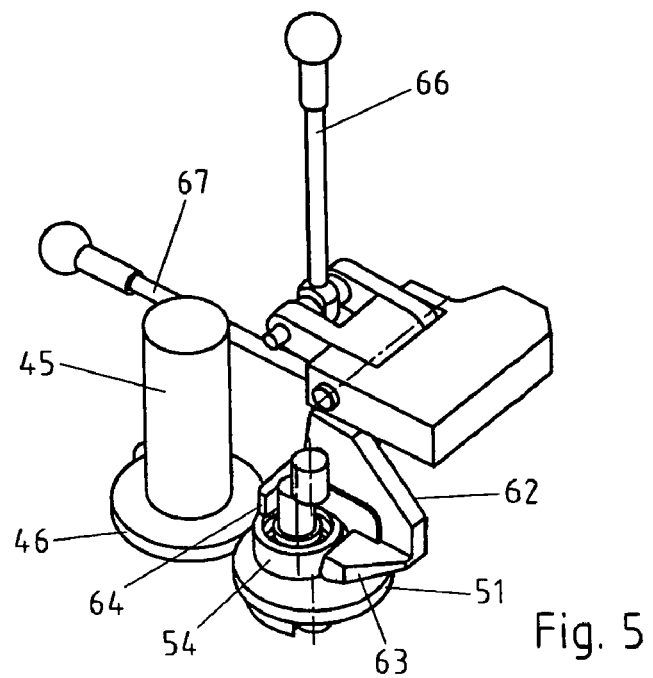

The FIGS. 3 and 4 represent the measuring head according to the invention in its unlocked state. In this case, the lever 62 is inclined and the rods 66 and 67 press on the support element 30 respectively on the second re-orientable element 50 so as to move the indexing elements 31, 41 respectively 42, 43 apart by a predetermined distance d1, respectively d2.

In a variant embodiment, the rods 66 and 67 could be driven by a pinion/rack unit.

The moving apart and the closing of the indexing surfaces take place thanks to the double action of the rods 66 and 67 which is independent of the direction of the weight force and of the inertia forces, and without springs or elastic elements having to be used. The inventive mechanism can thus also ensure a reliable and fast functioning whatever the orientation of the measuring head.

In unlocked position, the rotation around the two axes A and B is ensured by servomotors (not represented), controlled by the software of the measuring machine, or by other equivalent automatic actuators.

The embodiment described here comprises a single actuator for locking and unlocking the two axes A and B simultaneously. The invention however also includes variants in which each rotation axis is locked and unlocked by an independent actuator.

In one embodiment, the inventive measuring head comprises only a single rotation axis, for example a horizontal axis A.

Figure 10:
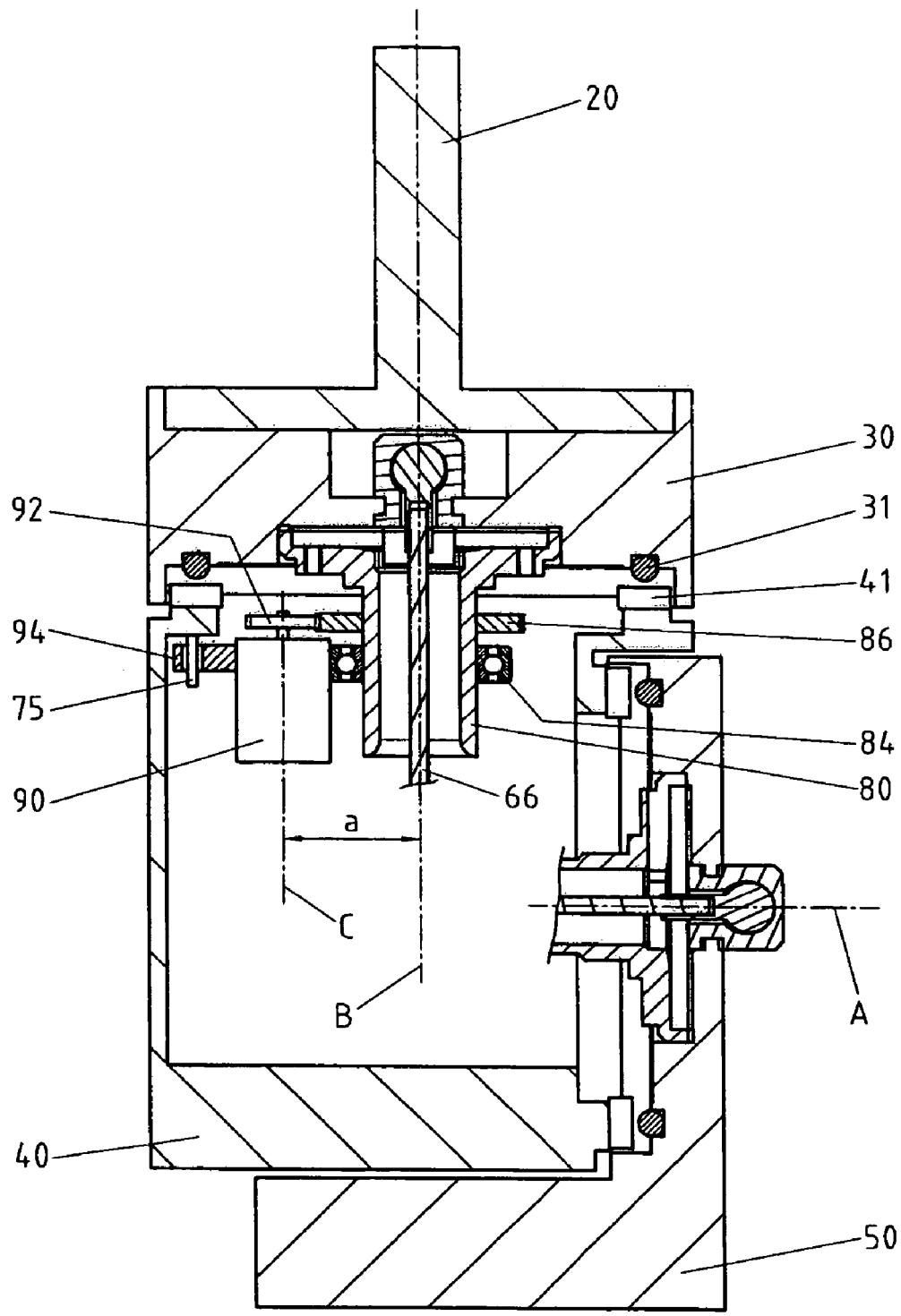
FIG. 10, the rotational actuator of the inventive measuring head.

The device driving the first re-orientable element 40 around the axis B will now be described with reference to FIG. 10. The second horizontal rotation axis A is optionally also provided with a driving device, which for the sake of brevity will not be described.

A fixed bushing 80 united with the support element 30 and coaxial with the axis B bears a fixed toothed wheel 86 onto which the pinion 92 is engaged, directly driven by the axis C of the motor 90.

In the unlocked position, the bearing 84 allows the motor 90 to rotate freely around the axis B. The center distance of axes (a) between the axis B and the axis C of the motor 90 is constant and the play between the pinion 92 and the wheel 86 is also constant, for all the positions of the re-orientable element 40, which allows the angular error to be minimized. The center distance of axes (a) between the toothed wheel 86 and the pinion 92 is rigidly determined by the bearing 84.

The motor 90 is preferably a pulse motor and, if necessary, can also comprise a mechanical gear reduction unit or a friction of the end-of-run sensors, or an angular encoder to determine accurately the trajectory of the probe feeler. Alternatively, these elements can be provided in the form of independent components. The bearing 84 can be replaced, depending on the circumstances, with an antifriction bearing or any other equivalent guiding device.

The transmission of the rotation between the motor and the first re-orientable element is not rigid but occurs through a transmission element with a play, to avoid any alteration of the isostatic resting condition in the locked position. The motor 90 comprises on its periphery a guiding hole 94 into which the finger 75 united with the re-orientable element 40 engages and parallel to said first axis B. In this manner, the re-orientable element 40 is driven in rotation around the axis B by the motor 90 whilst remaining free to slide axially between the locked position and the unlocked position.

The switch to the locked position simply comprises the sliding of the finger 75 inside the hole 94, without the relative position of the motor 90 relatively to the axis B and to the support element 30 changes. The motor 90 and the gearings 86, 92 do not follow the re-orientable element 40 in its sliding movement along the axis B. The play between the hole 94 and the finger 75 is sufficient to exclude any influence on the indexing accuracy in locked position.

Advantageously, the pair constituted by the finger 75 and the hole 94 is placed at a maximum distance of the axis B to minimize the transmitted force. The considerable center distance of axes between the finger 75 and the axis B also allows the optimum play between the finger 75 and the hole 94 to be chosen more easily.

It has been determined that a play between 0.005 and 1.0 millimeter allows an accurate positioning of the re-orientable element in the different indexed positions without altering the indexing accuracy, an optimum functioning being achieved with a play comprised between 0.01 and 0.1 millimeter. Optionally, the finger 75 can be profiled to increase the play in locked position.

Naturally, the finger 75 and the hole 94 could be replaced by another transmission device capable of driving the re-orientable element 40 in rotation by the motor 90, for example by a groove and tongue, by a slider or by another other equivalent arrangement.

In a variant embodiment, not represented, the motor 90 can be placed in the rotation axis B, with the shaft of the motor 90 directly united with the support element 30 so as to eliminate the gearings 86 and 90. In this embodiment, the center distance of axes (a) between the rotation axis B of the first re-orientable element and the axis of the motor 90 is reduced to zero and the motor, whose shaft is locked relatively to the support element 30, and which is advantageously provided with a mechanical gear reduction unit, turns on itself, driving the re-orientable element 40 through the pair formed by the finger 75 and hole 94.

In other embodiments, the driving system or systems can be made symmetrical, i.e. they are to be found in the support element 30 and/or in the second re-orientable element 50 rather than in the first re-orientable element 40.

The invention claimed is:

1. Orientable measuring head for orienting a probe feeler 60 relatively to a measuring apparatus, including:
   a support element;
   a first re-orientable element connected to said support element and capable of turning around a first axis relatively to said support element;
   a rotation actuator, connected so as to be able to turn around said first axis;
   a first transmission between said support element and said rotation actuator for driving said actuator around said first axis at a constant distance of said first axis;
   a second transmission between said rotation actuator and said first re-orientable element, for driving said first re-orientable element.

2. The measuring head of claim 1, wherein said second transmission includes a play.

3. The measuring head of claim 2, wherein said play is comprised between 0.005 and 1.0 millimeter.

4. The measuring head of claim 1, wherein said first transmission comprises a couple of toothed wheels of which one is united with said support element and the other is directly driven by a motor.

5. The measuring head of claim 1, comprising a bearing to support said actuator.

6. The measuring head of claim 1, wherein said first re-orientable element can slide in the direction of the axis between a locked position and an unlocked position.

7. The measuring head of claim 6, wherein said actuator does not change position relatively to said support element when said first re-orientable element slides in the direction of the axis.

8. The measuring head of claim 7, wherein said second transmission includes an element united with said first re-orientable element and parallel to said first axis.

9. The measuring head of claim 1, including:
a plurality of mobile positioning elements united with said first re-orientable element;
a plurality of fixed positioning elements united with said support element and capable of engaging with said mobile positioning elements to define a plurality of predetermined orientations of said first re-orientable element relatively to said fixed element.

10. The measuring head of claim 9, including:
a second re-orientable element connected with said first re-orientable element capable of turning relatively to said first re-orientable element along a second axis;
a second rotation actuator connected so as to be able to turn around said first axis;
a third transmission between said first re-orientable element and said second rotation actuator for driving said actuator around said second axis at a constant distance from said second axis;
a fourth transmission between said second rotation actuator and said second re-orientable element, for driving said second re-orientable element.

11. The measuring head of claim 10, wherein said first axis and second axis are essentially orthogonal.

* * * * *